US010353187B2

(12) United States Patent
O'Neill

(10) Patent No.: US 10,353,187 B2
(45) Date of Patent: Jul. 16, 2019

(54) STRETCHED FRESNEL LENS SOLAR CONCENTRATOR FOR SPACE POWER, WITH CORDS, FIBERS, OR WIRES STRENGTHENING THE STRETCHED LENS

(71) Applicant: Mark Joseph O'Neill, Keller, TX (US)

(72) Inventor: Mark Joseph O'Neill, Keller, TX (US)

( * ) Notice: Subject to any disclaimer, the term of this patent is extended or adjusted under 35 U.S.C. 154(b) by 0 days.

(21) Appl. No.: 13/947,083

(22) Filed: Jul. 21, 2013

(65) Prior Publication Data

US 2015/0022909 A1    Jan. 22, 2015

(51) Int. Cl.
*G02B 7/02* (2006.01)
*G02B 19/00* (2006.01)
*G02B 3/08* (2006.01)

(52) U.S. Cl.
CPC ........... *G02B 19/0042* (2013.01); *G02B 3/08* (2013.01); *G02B 7/02* (2013.01)

(58) Field of Classification Search
CPC ...... G02B 1/04; G02B 1/041; G02B 19/0042; G02B 21/0028; G02B 19/0014; G02B 19/008; G02B 7/02; Y02E 10/52; Y02E 10/10; Y02E 10/40; F24J 2002/1004; F24J 2/08; F24J 2/12; C09K 11/59; H01L 31/02327; H01L 31/0524; A61F 2009/0087; A61F 2/1648; B64G 1/443; H01B 13/0013
See application file for complete search history.

(56) References Cited

U.S. PATENT DOCUMENTS

| 5,578,139 A * | 11/1996 | Jones ...................... B64G 1/44 |
| | | 136/245 |
| 6,031,179 A | 2/2000 | O'Neill |
| 6,075,200 A | 6/2000 | O'Neill |
| 8,636,253 B1 * | 1/2014 | Spence et al. ............. 244/172.8 |
| 2005/0011513 A1 * | 1/2005 | Johnson ..................... F24J 2/07 |
| | | 126/698 |

OTHER PUBLICATIONS

Mark J. O'Neill et al., "Stretched Lens Array SquareRigger (SLASR) Technology Maturation," 19th Space Photovoltaic Research and Technology Conference (SPRAT XIX), Sep. 20 to 22, 2005, Cleveland, Ohio.

(Continued)

*Primary Examiner* — Alicia M Harrington
(74) *Attorney, Agent, or Firm* — Hulsey P.C.

(57) ABSTRACT

This invention includes a flexible Fresnel lens assembly which can be efficiently stowed into a small volume, and then deployed with a mechanism, including structural elements, that provides tensioning at the ends of the lens assembly to position and support the lens assembly in proper position relative to a photovoltaic receiver, onto which the lens assembly focuses sunlight for conversion into electricity. The flexible stretched lens assembly includes a transparent prismatic polymer film, comprising a refractive optical element, attached to flexible cords, fibers, or wires that carry the bulk of the tension load in the stretched lens assembly when it is deployed in its final functional position. This present invention represents a critical and mission-enabling improvement to an earlier stretched lens array invention described in U.S. Pat. No. 6,075,200 (Reference 1).

16 Claims, 1 Drawing Sheet

(56) References Cited

OTHER PUBLICATIONS

Mark J. O'Neill et al., "Stretched Lens Array (SLA) for Solar Electric Propulsion (SEP)," 20th Space Photovoltaic Research and Technology Conference (SPRAT XX), Sep. 25-27, 2007, Cleveland, Ohio.

Philip Jenkins el al., "TacSat-4 Solar Cell Experiment: Advanced Solar Cell Technologies in a High Radiation Environment," 34th IEEE Photovoltaic Specialists Conference, Jun. 7-12, 2009, Philadelphia, Pennsylvania.

Philip Jenkins et al., "Initial Results from the TacSat-4 Solar Cell Experiment," 39th IEEE Photovoltaic Specialists Conference, Jun. 16-21, 2013, Tampa, Florida.

\* cited by examiner

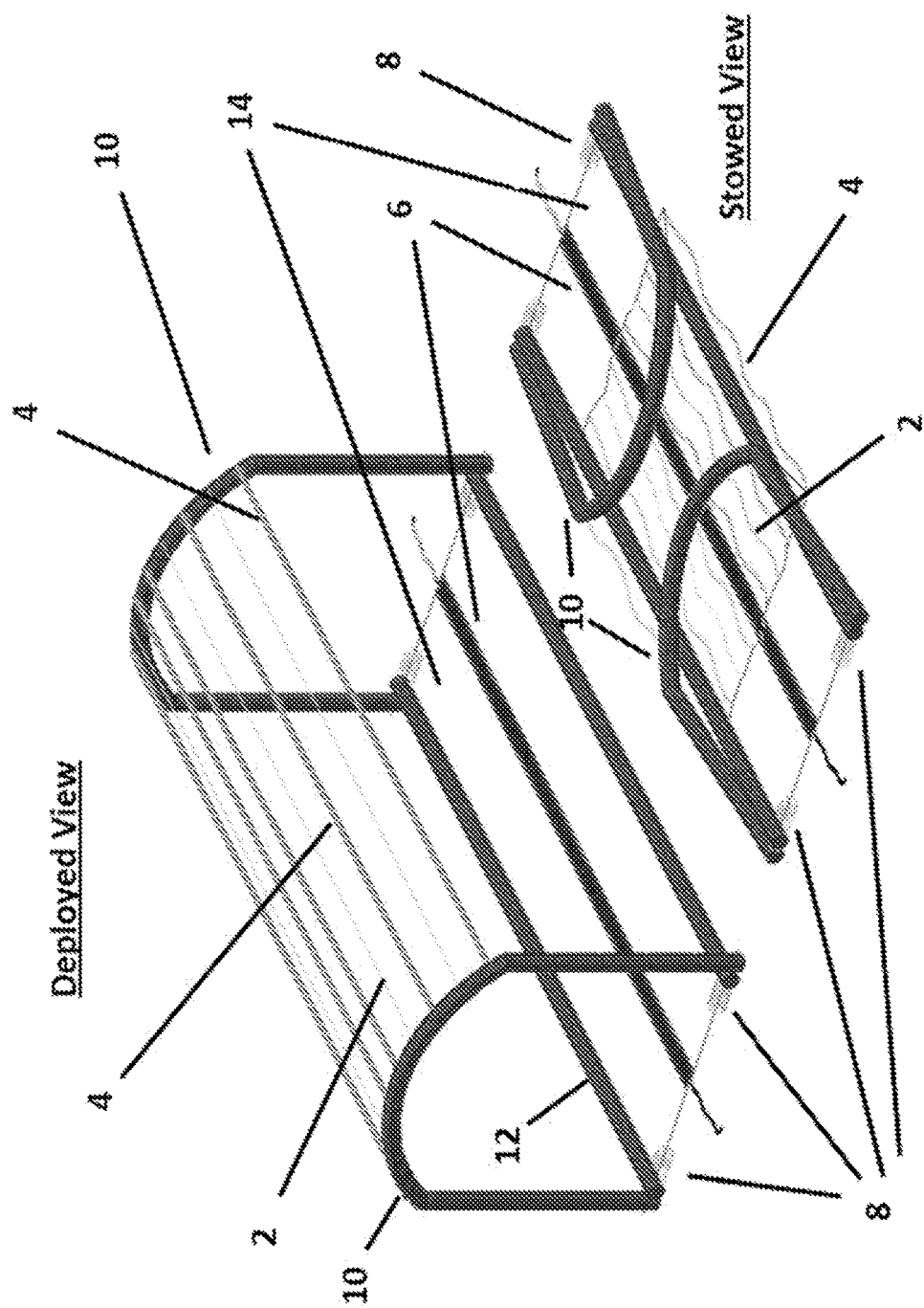

STRETCHED FRESNEL LENS SOLAR CONCENTRATOR FOR SPACE POWER, WITH CORDS, FIBERS, OR WIRES STRENGTHENING THE STRETCHED LENS

CROSS REFERENCE TO RELATED APPLICATION

The present non-provisional application for patent was previously submitted to the U.S. Patent and Trademark Office as a provisional application, Application No. 61/676,961, filed on Jul. 29, 2012, with Confirmation No. 7647. The title, inventor, and disclosed invention were the same for the earlier provisional application as for this present non-provisional application. The inventor hereby claims the filing date of the earlier provisional application, namely Jul. 29, 2012.

BACKGROUND

The present inventor previously invented the Stretched Fresnel Lens for Space Power, as described in U.S. Pat. No. 6,075,200 (Reference 1). NASA and the U.S. Department of Defense have recognized the many advantages of this Stretched Lens Array (SLA) technology for space power, and have funded a number of R&D contracts totaling about $10,000,000 to develop, test, mature, and fly SLA technology (References 2 through 4). SLA offers dramatic improvements in all of the critical performance metrics for space solar arrays, including lower cost ($/Watt of array power output), higher specific power (Watts/kilogram of array mass), higher stowed power (Watts/cubic meter of launch volume), improved photovoltaic cell radiation hardness (due to smaller cell sizes, allowing thicker radiation shielding at lower mass penalty), and higher voltage operation (again due to the smaller cell sizes, allowing thicker dielectric insulation at lower mass penalty). However, the previously patented version of SLA requires the flexible lens material itself to be placed in tension for the life of the deployed array, which can be subject to severe temperature variations on orbit as the array passes into the Earth's shadow and out again into full space sunlight as the spacecraft orbits the Earth. The presently preferred stretched lens material is silicone rubber, specifically Dow Corning DC93-500 material, which is mechanically weak (with a tensile strength of about 1,200 psi or 8 MPa, and with a modulus of elasticity of about 500 psi or 3.5 MPa) and which has a gigantic coefficient of thermal expansion/contraction (about 300 ppm/° C.). In a recent space flight experiment on TacSat 4 (Reference 4), a small SLA performed well for the first six months of the flight, but then suffered a dramatic drop in power in the seventh month which was due to the lens developing a tear or rip, which finally led to complete lens failure in the fourteenth month of the flight (Reference 5). Failure analysis (Reference 5) identified the following combined effects as the cause of the lens failure: (i) the weak silicone material, (ii) continuous tensioning (stretching) of the weak silicone material, (iii) space radiation (including electrons, protons, and solar ultraviolet photons) embrittlement of the silicone material, causing the material to stiffen, harden, and weaken, (iv) high cyclic stresses due to many hundreds of thermal cycles. When the lens ripped all the way across in the fourteenth month of the flight, the solar cells previously in the focus of the stretched lens lost all effects of concentration of sunlight and returned to much lower one-sun performance levels. The present invention solves this SLA problem by introducing lightweight but strong cords, fibers, or wires to support the weak silicone material, which will no longer be required to carry the mechanical load of the stretched lens. Instead, the mechanical load from tensioning the stretched lens will be carried by the cords, fibers, or wires, and the lens itself will be supported by the cords, fibers, or wires, and will always remain in a low stress condition. This new invention therefore represents a more elegant, stiffer, more thermally stable, and longer lifetime version of the original SLA, with the same outstanding performance metric attributes and low cost, but without the limited lifetime.

BRIEF SUMMARY OF THE INVENTION

This invention includes a flexible Fresnel lens assembly which can be efficiently stowed into a small volume, and then deployed with a mechanism, including structural elements, that provides tensioning at the ends of the lens assembly to position and support the lens assembly in proper position relative to a photovoltaic receiver, onto which the lens assembly focuses sunlight for conversion into electricity. The flexible stretched lens assembly includes a transparent prismatic polymer film, comprising a refractive optical element, attached to flexible cords, fibers, or wires that carry the bulk of the tension load in the stretched lens assembly when it is deployed in its final functional position. This present invention represents a critical and mission-enabling improvement to an earlier stretched lens array invention described in U.S. Pat. No. 6,075,200 (Reference 1).

BRIEF DESCRIPTION OF THE DRAWINGS

FIG. 1 presents two perspective views of the new stretched lens array (SLA) invention in schematic form, including the Fresnel lens assembly, which includes a transparent flexible prismatic polymer Fresnel lens plus the cords, fibers, or wires to support the Fresnel lens, the deployment and tensioning mechanism, the photovoltaic receiver located in the focal region of the lens where sunlight is concentrated, and a radiator for keeping the photovoltaic cells cool enough to provide high sunlight-to-electricity conversion efficiency. The top view of FIG. 1 shows the stretched lens array in deployed position ready for use, such as on orbit in space. The bottom view of FIG. 1 shows the stretched lens array in stowed position for low-volume packaging, such as in a launch vehicle for a spacecraft to be placed into orbit. In actual practice, as one of ordinary skill in the art would readily understand, multiple lenses and multiple photovoltaic receivers would be integrated into a larger solar array, but FIG. 1 shows the basic building block of a larger array. Furthermore, while FIG. 1 shows spring-loaded end arches which pop up into position to tension and support the lens assembly, including the prismatic Fresnel lens and its supporting cords, fibers, or wires, many other means of deploying and tensioning the stretched lens assembly are well known in the art, including the SquareRigger platform described in Reference 2. The critical new element of the present invention is represented by the supporting cords, fibers, or wires, which support the thin flexible polymer lens, so that the weak polymer lens does not have to carry the tension load by itself. These cords, fibers, or wires can be embedded in the polymer lens or bonded to the polymer lens or otherwise mechanically integrated with the polymer lens to reduce the tension stress in the polymeric lens by sharing the tension force, thereby extending the polymeric lens lifetime in its intended application

DETAILED DESCRIPTION AND BEST MODE OF IMPLEMENTATION

The present invention is best understood by referring to the attached drawing, which shows a preferred embodiment in two positions, deployed in the top view and stowed in the bottom view. Referring to FIG. 1, the new stretched lens array invention includes a thin transparent flexible polymeric Fresnel lens 2 which includes a plurality of small prisms configured to refractive incident sunlight into a focal region where a photovoltaic receiver 6 is located to convert the concentrated sunlight into electricity. The polymeric lens 2 is mechanically integrated with cords, fibers, or wires 4 which share a tension load in the lens assembly, which includes the polymeric lens 2 and the cords, fibers, or wires 4. The lens assembly is mechanically integrated with end arches 10 which provide the tensioning force on the deployed lens assembly. A deployment mechanism 8 is needed to move the end arches 10 from their stowed position into their final deployed position. An example mechanism 8 uses simple torsion springs to rotate the end arches 10 up into their final deployed position, where the end arches 10 provide a tensioning force into the cords, fibers, or wires 4 which support the polymeric lens 2. The final deployed position of the arches 10 and lens 2 represents the proper location of the lens 2 so that it focuses incident sunlight onto the photovoltaic receiver 6. The photovoltaic receiver 6 is mounted to a radiator 14 which dissipates waste heat from the photovoltaic receiver 6 to maintain the photovoltaic receiver 6 at a reasonable temperature for high solar-to-electrical conversion efficiency. If needed, additional structural elements 12 can be added to the stretched lens array to further support the arches 10 and the radiator 14. The present invention is similar to the earlier stretched lens array invention of Reference 1 but now has the critical mission feature that limited the lifetime of the earlier invention, namely the cords, fibers, or wires 4 which reduce the stress in the weak polymeric lens 2 when the lens assembly is tensioned for deployment and support. Without the cords, fibers, or wires 4 the lens 2 can fail on orbit after experiencing the combined effects of continuous tensioning (stretching), space radiation (including protons, electrons, and solar ultraviolet photons) embrittlement (stiffening, hardening, and weakening), and repeated thermal cycling as the solar array goes into and out of the Earth's shadow. The cords, fibers, or wires 4 are therefore an enabling feature of the present invention, solving a "show-stopper" problem of the original invention.

For the preferred embodiment shown in FIG. 1, the polymeric lens 2 can be made from a space-qualified silicone rubber such as Dow Corning DC 93-500 material, with a total thickness of about 0.010 inch (0.25 mm). Such lenses are described in References 2, 3, and 4. For space applications, the lens should be coated on its outside surface with an ultraviolet rejection (UVR) coating which blocks the vacuum ultraviolet (VUV) wavelengths below 200 nm, since these wavelengths can darken the silicone lens material as described in References 2 and 3. The cords, fibers, or wires 4 can be made from any of a variety of space-qualified materials, including high-strength polymer cords such as Vectran or Kevlar, or high-strength carbon fibers, or high-strength metal wires such as aluminum or titanium. As an example of the relative strength of the cords, fibers, or wires 4, compared to the lens 2, the modulus of elasticity of aluminum is 70 GPa (10,000,000 psi) versus 0.0035 GPa (500 psi) for the silicone material, a ratio of 20,000. Similarly, the tensile strength of aluminum is typically 300-600 MPa (44,000-88,000 psi) versus 8 MPa (1,200 psi) for the silicone material, a ratio of 38-75. As an example of the coefficient of thermal expansion (CTE) of the cords, fibers, or wires 4, compared to the lens 2, aluminum's CTE is about 23 ppm/° C., while the silicone's CTE is about 300 ppm/° C., a ratio of 13. Therefore tiny aluminum wires could be used to support the tensioned lens assembly, with very little light blockage, providing a much stiffer, more thermally stable, and much longer lifetime assembly than the silicone lens by itself. The end arches 10 can be made from a number of different space-qualified materials such as carbon composites, aluminum, or titanium. The attachment of the lens 2 to the cords, fibers, or wires 4 can be accomplished in several ways, including molding these elements 4 into the lens 2 during its manufacture, or by bonding these elements 4 onto the lens 2 after its manufacture. The attachment of the cords, fibers, or wires 4 to the end arches 10 can be done in a variety of ways, from using mechanical means such as fasteners, to using adhesives, many of which exist which are fully space qualified, or with a combination of adhesives and mechanical means.

The photovoltaic receiver 6 can be assembled from high-efficiency multi-junction solar cells, such as the three junction devices presently being made by Spectrolab, a California-based unit of Boeing Company, or Emcore, a public company in New Mexico, or several other companies in the world. Many companies are working on four-junction and six-junction solar cells for the future, using a configuration called inverted metamorphic (IMM), and these cells would be ideally suited for use in the photovoltaic receiver 6 when they become available. The solar cells in the photovoltaic receiver 6 can be interconnected in series using welded silver interconnects or other electrical conductors, and bonded to the radiator with thermally conductive silicone with alumina loading. A dielectric film such as polyimide can be included in the adhesive layer to provide better electrical insulation between the photovoltaic receiver 6 and the radiator 14. The top of the photovoltaic receiver 6 can be protected and insulated with a thin ceria-doped glass cover, of typically 0.004 inches (100 microns) to 0.020 inches (500 microns) thickness, depending on the radiation exposure of the space mission. The cover glass is typically bonded to the photovoltaic receiver 6 using clear silicone adhesive such as Dow Corning DC 93-500, the same material used to make the lens 2. A bypass diode is typically added to protect each cell from reverse bias voltage damage which could occur due to shadowing or cell cracking. Persons of ordinary skill in the art will be familiar with the construction and manufacture of the photovoltaic receiver 6.

The size of the lens 2 is typically selected based on thermal considerations, specifically the thickness and mass of the radiator 14. If the lens aperture is small, for example 10 cm or less, the thickness and mass of the radiator 14 can be small while the radiator 14 still provides excellent thermal performance in rejecting waste heat from the photovoltaic receiver 6. For a small aperture lens 2, the radiator 14 can be made of thin carbon fiber reinforced composite sheet, such as carbon fiber fabric reinforced with cyanate ester, of a small overall thickness of about 0.005 inches (125 microns). Alternatively, the radiator 14 can be made of thin aluminum of about 0.005 inches (125 microns) with an aluminum oxide coating to improve the emissivity of the surfaces of the radiator.

The Fresnel lens 2, which comprises a refractive optical element, would perform best if its prismatic pattern includes color-mixing features as taught in U.S. Pat. No. 6,031,179 (Reference 6). While the lens assembly could be deployed in a flat form as opposed to an arched form, and still clearly fall within the scope of this present invention, a convex arched lens provides superior optical performance as described in References 2 and 3, and therefore represents the preferred embodiment.

The new invention, including the embodiment shown in FIG. 1, and many other embodiments which can be conceived by those of ordinary skill in the art, offers many advantages over other space solar photovoltaic arrays, including other concentrating arrays which use mirrors or lenses to focus sunlight onto photovoltaic cells. The new invention provides unprecedented performance and cost advantages in all of the critical performance metrics for space solar arrays, including lower cost ($/Watt of array power output), higher specific power (Watts/kilogram of array mass), higher stowed power (Watts/cubic meter of launch volume), improved photovoltaic cell radiation hardness (due to smaller cell sizes, allowing thicker radiation shielding at lower mass penalty), and higher voltage operation (again due to the smaller cell sizes, allowing thicker dielectric insulation at lower mass penalty). The small size of the photovoltaic cells reduces the area, mass, and cost of these expensive devices compared to other space solar arrays, including planar one-sun arrays and other concentrator arrays which typically operate at lower concentration ratio and lower optical efficiency, such as the ATK Cell-Saver® array which provides about 1.8× concentration, while SLA typically provides about 8-10× concentration. As highlighted in References 2 and 3, SLA offers spectacular performance for many space missions, especially those requiring high power, high voltage, and high radiation hardness. Solar electric propulsion (SEP) is one such application where SLA offers unparalleled performance and cost, as discussed in Reference 3.

While one primary embodiment of the new invention is configured for ultra-light-weight solar power arrays for spacecraft, the same stretched lens array (SLA) technology can offer significant benefits for ground-based solar power systems, and other embodiments of the new invention for terrestrial power are included in the scope and spirit of the invention. Indeed, a terrestrial spin-off of the original SLA invention described in U.S. Pat. No. 6,075,200 recently won a prestigious 2012 R&D 100 Award, as described under the SolarVolt Module at this NASA web site: https://rt.grc.nasa.gov/2012/nasa-glenn-advancements-green-energy-lightweight-materials-win-rd-100-awards/. The present new invention will enable improved terrestrial solar concentrators as well as improved space solar concentrators by enabling the use of thinner, lighter, cheaper Fresnel lenses.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention. For example, the pattern of cords, fibers, or wires shown in FIG. 1 is just exemplary. One of ordinary skill in the art of space solar array mechanical and structural design will select the pattern of cords, fibers, or wires to best meet the mission requirements of his or her planned space mission, including expected acceleration loads on the solar array, radiation environment and duration of the mission, deployment mechanism and solar array wing interfaces with the solar array drive system and spacecraft, etc. The best pattern for a particular mission will involve the trade-off between aperture shading by the cords, fibers, or wires and structural requirements for lens deployment and support over the mission. While only parallel tensioned cords, fibers, or wires are shown in FIG. 1, one of ordinary skill in the art will recognize that these parallel cords, fibers, or wires can be connected by other cords, fibers, or wires running perpendicular or at a diagonal angle to the parallel set of cords, fibers, or wires, to maintain the desired spacing and arrangement of the parallel set of cords, fibers, or wires. Similarly, for another example, while only two arches are shown attached to the cords, fibers, or wires in FIG. 1, one of ordinary skill in the art of space solar arrays will understand that multiple additional arches may be replicated at intervals along the solar array wing for added support and shape control. The invention should therefore not be limited by the above described embodiments, methods, and examples, but by all embodiments and methods within the scope and spirit of the invention.

REFERENCES

Incorporated Herein by Reference

1. Mark J. O'Neill, "Stretched Fresnel Lens Solar Concentrator for Space Power," U.S. Pat. No. 6,075,200, Jun. 13, 2000.
2. Mark J. O'Neill et al., "Stretched Lens Array SquareRigger (SLASR) Technology Maturation," 19th Space Photovoltaic Research and Technology Conference (SPRAT XIX), Sep. 20 to 22, 2005, Cleveland, Ohio.
3. Mark J. O'Neill et al., "Stretched Lens Array (SLA) for Solar Electric Propulsion (SEP)," 20th Space Photovoltaic Research and Technology Conference (SPRAT XX), Sep. 25-27, 2007, Cleveland, Ohio.
4. Philip Jenkins et al., "TacSat-4 Solar Cell Experiment: Advanced Solar Cell Technologies in a High Radiation Environment," 34th IEEE Photovoltaic Specialists Conference, Jun. 7-12, 2009, Philadelphia, Pa.
5. Philip Jenkins et al. (including the present inventor), "Initial Results from the TacSat-4 Solar Cell Experiment," 39th IEEE Photovoltaics Specialists Conference, Jun. 16-21, 2013, Tampa, Fla.
6. Mark J. O'Neill, "Color Mixing Lens for Solar Concentrator System and Methods of Manufacture and Operation Thereof," U.S. Pat. No. 6,031,179, Feb. 29, 2000.

What is claimed is:

1. A solar energy concentrator for a spacecraft, comprising:
   a Fresnel lens comprising a transparent material containing refractive prisms, said Fresnel lens having a first set of opposing edges and a length defined by said first set of opposing edges, a second set of opposing edges and a width defined by said second set of opposing edges, a top surface, and a bottom surface, and a thickness defined by said top and bottom surfaces; and
   a supporting element located at each of the first set of opposing edges;
   said Fresnel lens having a plurality of strengthening elements embedded inside of said transparent material between said top surface and said bottom surface within said thickness, at least one of said plurality of strengthening elements being positioned between said second set of opposing edges and extending said length.

2. The solar energy concentrator of claim 1, wherein said plurality of strengthening elements comprises a cord.

3. The solar energy concentrator of claim 1, wherein said plurality of strengthening elements comprises a fiber.

4. The solar energy concentrator of claim 1, wherein said plurality of strengthening elements comprises a wire.

5. The solar energy concentrator of claim 1, wherein said flexible transparent material comprises silicone.

6. The solar energy concentrator of claim 1, wherein said plurality of strengthening elements are embedded into the flexible transparent material during molding of said Fresnel lens.

7. The solar energy concentrator of claim 1, wherein said transparent material is flexible.

8. The solar energy concentrator of claim 1, wherein said plurality of strengthening elements are flexible.

9. The solar energy concentrator of claim 1, wherein said plurality of flexible strengthening elements comprises aluminum wire.

10. The solar energy concentrator of claim 1, wherein the plurality of strengthening elements comprises strengthening elements arranged in a pattern, whereby a distance between the plurality of strengthening elements is less than 25% of the width.

11. The solar energy concentrator of claim 1, wherein said pattern comprises a first strengthening element arranged perpendicular to a second strengthening element.

12. The solar energy concentrator of claim 1, wherein the pattern comprises a first strengthening element arranged at an angle that is not perpendicular to a second strengthening element.

13. A method of strengthening a refractive optical element comprising:

providing a refractive optical element having multiple edges defining a periphery thereof, said refractive optical element supported via a tension force applied at two opposing edges of said periphery; and embedding multiple strengthening elements within said refractive optical element continuously between said two opposing edges, said strengthening elements having a modulus of elasticity greater than that of the refractive optical element, wherein the embedding at least a portion of the at least one strengthening element into at least a portion of the refractive optical element occurs during a cast-and-cure molding of the refractive optical element from a silicone material.

14. The method of strengthening a refractive element of claim 13, wherein the step of embedding is implemented by molding said multiple strengthening elements into said refractive optical element.

15. A method of strengthening a refractive optical element comprising:

providing a refractive optical element having multiple edges defining a periphery thereof, said refractive optical element supported via a tension force applied at two opposing edges of said periphery; and embedding multiple strengthening elements within said refractive optical element continuously between said two opposing edges, said strengthening elements having a modulus of elasticity greater than that of the refractive optical element, wherein the step of embedding of said multiple strengthening elements comprises arranging said multiple elements in more than one direction inside said periphery of said refractive optical element.

16. The method of strengthening a refractive element of claim 15, wherein the step of embedding is implemented by molding said multiple strengthening elements into said refractive optical element.

* * * * *